US010394567B2

(12) United States Patent
Ghai et al.

(10) Patent No.: US 10,394,567 B2
(45) Date of Patent: *Aug. 27, 2019

(54) TEMPORARILY FAVORING SELECTION OF STORE REQUESTS FROM ONE OF MULTIPLE STORE QUEUES FOR ISSUANCE TO A BANK OF A BANKED CACHE

(71) Applicant: INTERNATIONAL BUSINESS MACHINES CORPORATION, Armonk, NY (US)

(72) Inventors: Sanjeev Ghai, Round Rock, TX (US); Guy L. Guthrie, Austin, TX (US); Hugh Shen, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,418

(22) Filed: Nov. 29, 2017

(65) Prior Publication Data
US 2018/0350427 A1 Dec. 6, 2018

Related U.S. Application Data

(63) Continuation of application No. 15/615,313, filed on Jun. 6, 2017.

(51) Int. Cl.
G11C 11/406 (2006.01)
G06F 9/38 (2018.01)
(Continued)

(52) U.S. Cl.
CPC .......... *G06F 9/3851* (2013.01); *G06F 9/3012* (2013.01); *G06F 9/546* (2013.01); *G06F 12/08* (2013.01)

(58) Field of Classification Search
CPC ............ G11C 11/40607; G06F 9/3851; G06F 9/3012; G06F 9/546; G06F 12/08
See application file for complete search history.

(56) References Cited

U.S. PATENT DOCUMENTS 5,023,776 A * 6/1991 Gregor ................ G06F 12/0811
711/118
6,161,208 A * 12/2000 Dutton ................ G06F 11/1008
711/118
(Continued)

OTHER PUBLICATIONS

Joel M. Tendler et al. (POWER4 System Microarchitecture, Technical White Paper, IBM, Oct. 2001) (Year: 2001).*
(Continued)

*Primary Examiner* — Mushfique Siddique
(74) *Attorney, Agent, or Firm* — Brian F. Russell; Bryan Bortnick

(57) ABSTRACT

A data processing system includes a plurality of processor cores each having a respective store-through upper level cache and a store-in banked lower level cache. Store requests of the plurality of processor cores destined for the banked lower level cache are buffered in multiple store queues including a first store queue and a second store queue. In response to determining that the multiple store queues contain store requests targeting a common bank of the banked lower level cache, store requests from the first store queue are temporarily favored for selection for issuance to the banked lower level cache over those in the second store queue.

7 Claims, 8 Drawing Sheets

(51) Int. Cl.
*G06F 9/54* (2006.01)
*G06F 9/30* (2018.01)
*G06F 12/08* (2016.01)

(56) References Cited

U.S. PATENT DOCUMENTS

| | | | | |
|---|---|---|---|---|
| 6,460,133 B1* | 10/2002 | Nunez | ............ | G06F 9/3824 |
| | | | | 711/E12.033 |
| 2005/0251660 A1* | 11/2005 | Bell, Jr. | ............ | G06F 9/3824 |
| | | | | 712/225 |
| 2007/0288694 A1* | 12/2007 | Ghai | ............ | G06F 9/3824 |
| | | | | 711/118 |
| 2008/0082738 A1* | 4/2008 | Cypher | ............ | G06F 9/3824 |
| | | | | 711/108 |
| 2008/0091866 A1* | 4/2008 | Cox | ............ | G06F 13/1663 |
| | | | | 710/243 |
| 2009/0198867 A1* | 8/2009 | Guthrie | ............ | G06F 12/0815 |
| | | | | 711/100 |
| 2010/0268882 A1* | 10/2010 | Cargnoni | ............ | G06F 12/084 |
| | | | | 711/122 |
| 2010/0268887 A1* | 10/2010 | Ghai | ............ | G06F 12/0811 |
| | | | | 711/125 |
| 2010/0306477 A1* | 12/2010 | Luttrell | ............ | G06F 9/383 |
| | | | | 711/137 |
| 2013/0205091 A1* | 8/2013 | Liang | ............ | G06F 12/0846 |
| | | | | 711/130 |
| 2013/0262778 A1* | 10/2013 | Ghai | ............ | G06F 12/121 |
| | | | | 711/136 |

OTHER PUBLICATIONS

Steve Behling et al. (The POWER4 Processor Introduction and Tuning Guide, IBM, Nov. 2001, Chapter 1, 2) (Year: 2001).*

* cited by examiner

US 10,394,567 B2

TEMPORARILY FAVORING SELECTION OF STORE REQUESTS FROM ONE OF MULTIPLE STORE QUEUES FOR ISSUANCE TO A BANK OF A BANKED CACHE

BACKGROUND OF THE INVENTION

The present invention relates generally to data processing and, in particular, to promoting utilization of the store bandwidth of a banked cache.

A processor of a data processing system is typically supported by one or more levels of cache memory that buffer, in low latency storage, data and instructions likely to be accessed by the processor. To increase memory access bandwidth, caches can be implemented with a banked architecture in which each bank includes its own respective resources, such as queues, a data array, and a cache directory. In such banked caches, memory access requests are distributed among the banks based on selected bits of the addresses referenced by the memory access requests.

The increased memory access bandwidth potentially offered by banked cache architectures is only realized if the addresses referenced by memory access requests are well distributed. If the addresses of a workload are not well distributed but are instead concentrated in the address space associated with a subset of the available banks, the cache can undesirably operate utilizing only a fraction of the available memory access bandwidth.

BRIEF SUMMARY

In one or more embodiments, utilization of the store bandwidth of a banked cache memory is improved.

In at least one embodiment, a data processing system includes a plurality of processor cores each having a respective store-through upper level cache and a store-in banked lower level cache. Store requests of the plurality of processor cores destined for the banked lower level cache are buffered in multiple store queues including a first store queue and a second store queue. In response to determining that the multiple store queues contain store requests targeting a common bank of the banked lower level cache, store requests from the first store queue are temporarily favored for selection for issuance to the banked lower level cache over those in the second store queue.

DETAILED DESCRIPTION

Figure 1:
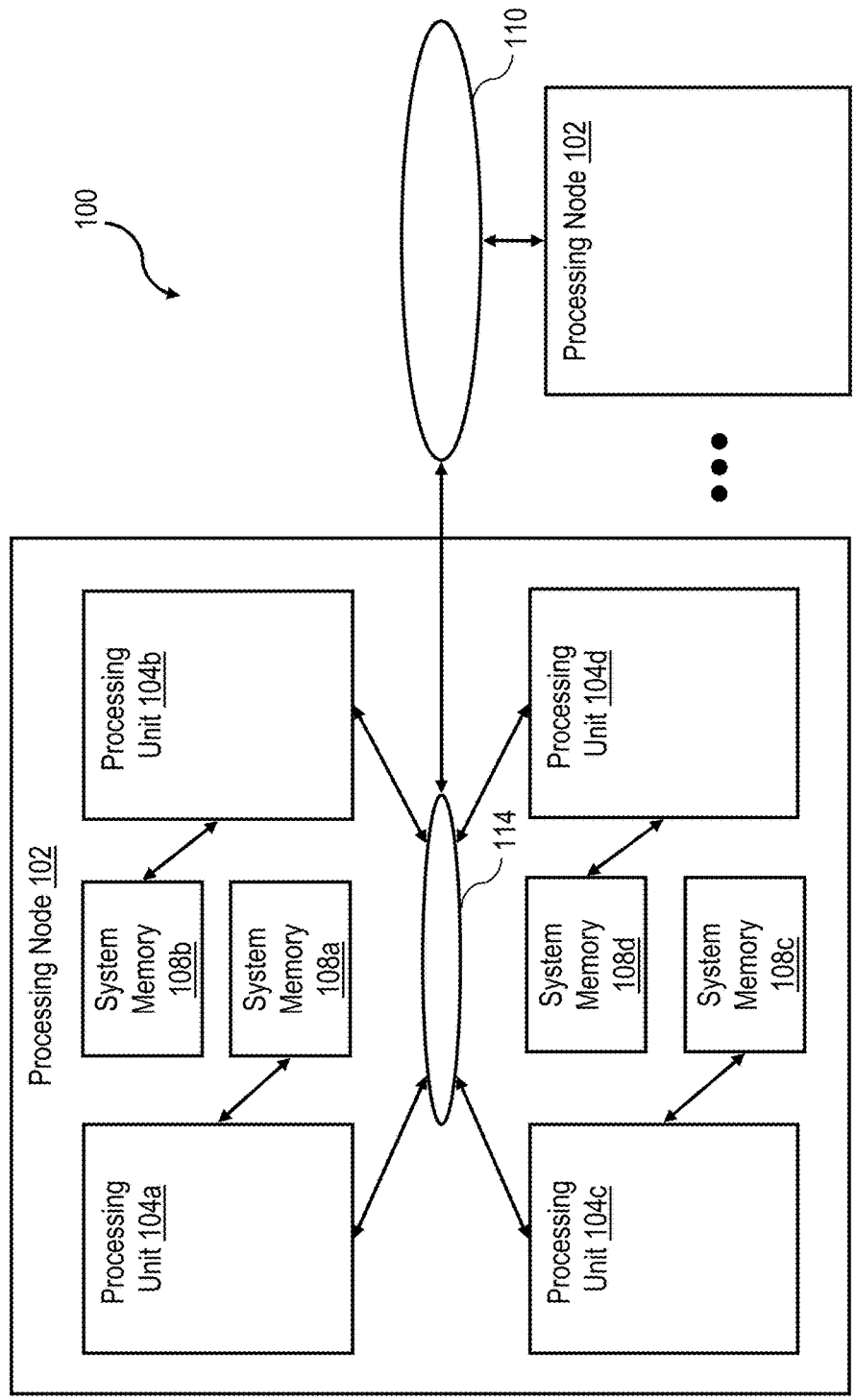
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units 104 each include a memory controller 106 coupled to local interconnect 114 to provide an interface to a respective system memory 108, such as one of system memories 108a-108d. Data and instructions residing in system memories 108 can generally be accessed, cached and modified by a processor core in any processing unit 104 of any processing node 102 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
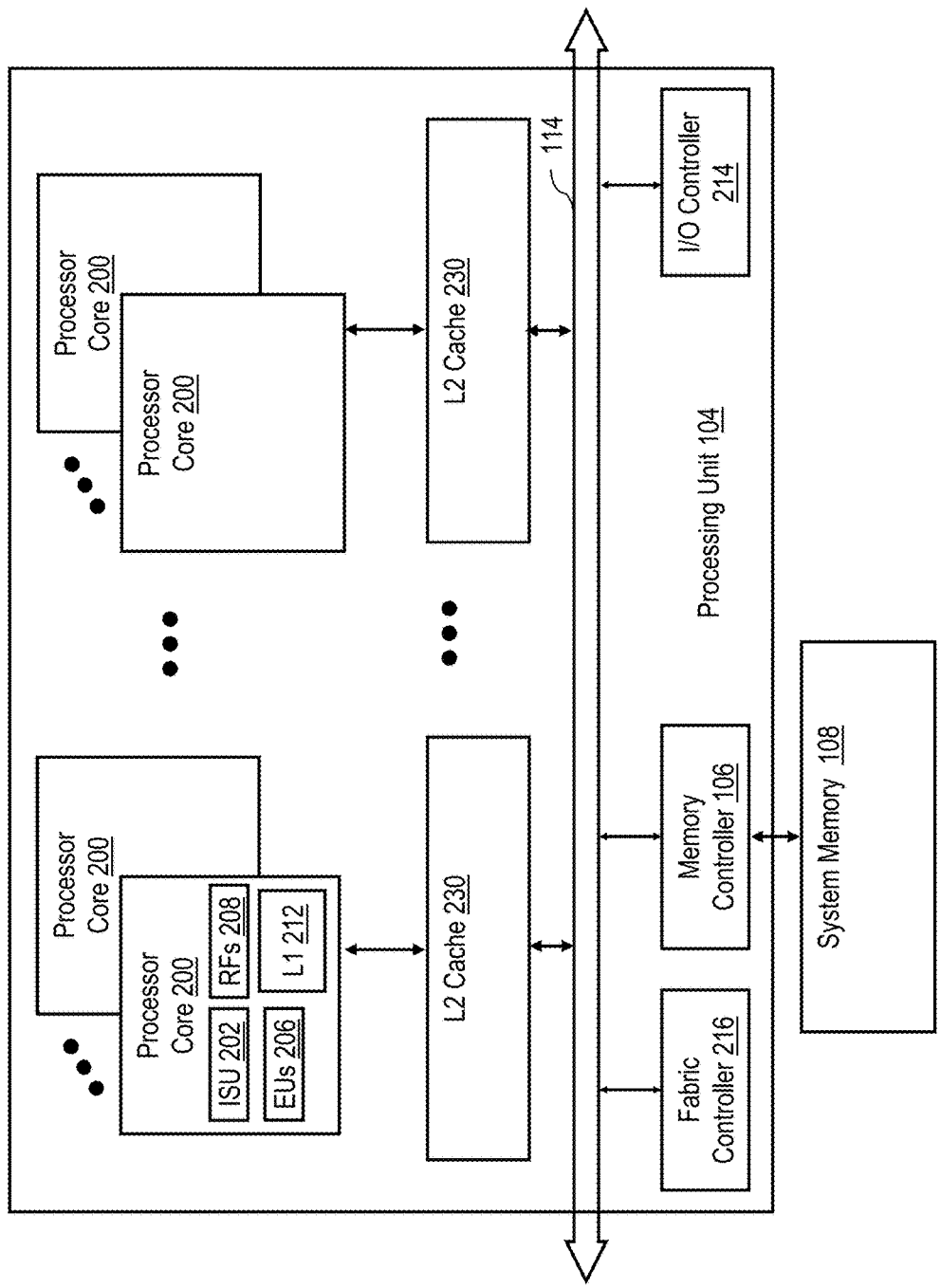
FIG. 2 is a block diagram of an exemplary processing unit in accordance with one embodiment.

Referring now to FIG. 2, there is depicted a more detailed block diagram of an exemplary processing unit 104 in accordance with one embodiment. In the illustrated embodiment, processing unit 104 is an individual integrated circuit chip including multiple processor cores 200 for processing instructions and data. Processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 may further include an integrated I/O (input/output) controller 214 supporting the attachment of one or more I/O devices (not depicted).

In a preferred embodiment, each processor core 200 of processing unit 104 supports simultaneous multithreading (SMT) and thus is capable of independently executing multiple hardware threads of execution simultaneously. In the given example, each processor core 200 includes an instruction sequencing unit (ISU) 202 that fetches instructions for execution by that processor core 200 and orders the execution of the instructions. Processor core 200 further includes one or more execution units 206 for executing instructions from the multiple simultaneous hardware threads of execution. The instructions can include, for example, fixed-point and floating-point arithmetic instructions, logical instructions, memory access instructions (e.g., load-type and store-type instructions), memory synchronization instructions, etc. In general, execution units 206 can execute instructions of each hardware thread in any order as long as data dependencies and hazards and explicit orderings mandated by memory synchronization instructions are observed. In at least one embodiment, execution units 206 include a load-store unit (LSU), which executes memory access instructions that request access to a memory block in the distributed shared memory system or cause the generation of a request for access to a memory block in the distributed shared memory system. Data obtained from the distributed shared memory system by memory accesses or generated by instruction execution are buffered in one or more register files (RFs) 208, each of which can include both an architecturally defined number of architected registers and a pool of rename registers. Data are written, in response to execution of memory access instructions by the LSU, from the one or more register files 208 to the distributed shared memory system.

The operation of each processor core 200 is supported by a multi-level memory hierarchy having at its lowest level a shared system memory 108 accessed via an integrated memory controller 106. At its upper levels, the multi-level memory hierarchy includes one or more levels of cache memory, which in the illustrative embodiment include a store-through level one (L1) cache 212 within and private to each processor core 200 and a store-in level two (L2) cache 230, which in at least some embodiments is shared by multiple processor cores 200. Although the illustrated cache hierarchies include only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Figure 3:
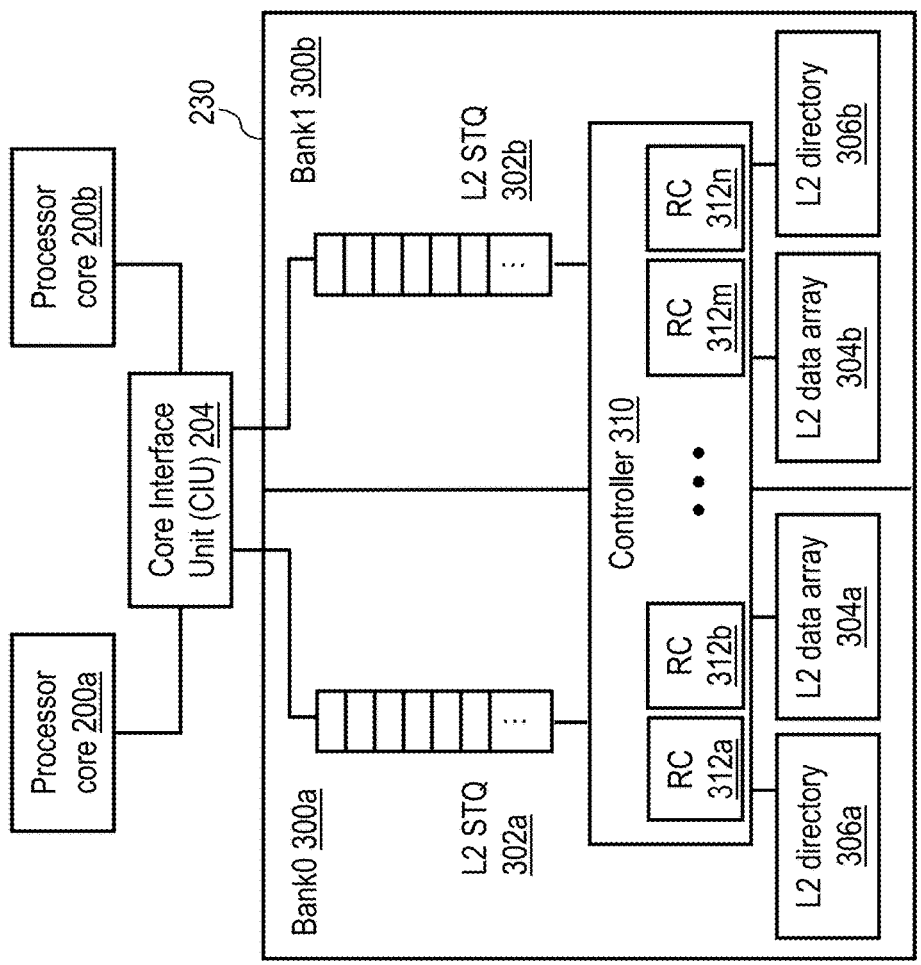
FIG. 3 is a block diagram of a lower level store-in cache memory in accordance with one embodiment.

With reference now to FIG. 3, there is illustrated a more detailed block diagram of a store-in lower level cache memory (e.g., L2 cache 230) in accordance with one embodiment. In the embodiment of FIG. 3, L2 cache 230 is a banked cache including two or more banks capable of handling memory access requests in parallel. In the particular embodiment illustrated in FIG. 3, the banks include bank0 300a and bank1 300b. Each of bank0 300a and bank1 300b includes a respective L2 store queue (STQ) 302a or 302b for receiving and temporarily buffering store-type requests and synchronization (barrier) requests received from the associated processor cores 200a, 200b via a core interface unit (CIU) 204. In at least one embodiment, each L2 STQ 302a, 302b is a unified store queue that buffers requests generated by all hardware threads of the affiliated processor cores 200a, 200b.

Each of bank0 300a and bank1 300b further includes a respective data array 304a or 304b and a L2 directory 306a or 306b of the contents of the associated data array 304a or 304b. In a preferred embodiment, data are distributed among the N banks (i.e., bank0 300a and bank1 300b) based on $2^{(N-1)}$ bits in the system memory (real) addresses utilized to uniquely identify storage locations in system memories 108. Thus, for the two banks 300a, 300b implemented in the embodiment illustrated in FIG. 3, one of banks 300a and 300b can be selected by a single bit in the real address, such as bit 56 of a 64-bit cache line address (including bits 0-63). Assuming data arrays 304a, 304b and L2 directories 306a, 306b are set-associative as is conventional, storage locations in system memories 108 are mapped to particular congruence classes within cache array 302 utilizing predetermined index bits within the system memory (real) addresses. The particular memory blocks stored within the cache lines of cache array 302 are recorded in L2 directory 308, which contains one directory entry for each cache line. While not expressly depicted in FIG. 3, it will be understood by those skilled in the art that each directory entry in cache directories 306 includes various fields, for example, a tag field that identifies (e.g., by address bits 57-63) the real address of the memory block held in the corresponding cache line of the associated data array 304, a state field that indicates the coherency state of the cache line, and inclusivity bits indicating whether the memory block is held in the associated L1 caches 212.

The operation of L2 cache 230 is controlled by a unified controller 310 that services both memory requests received from processor cores 200a, 200b and requests snooped from local interconnect 114 (see FIG. 2). Controller 310 includes multiple (e.g., 16 or 32) read-claim (RC) machines 312a-312n for independently and concurrently servicing load (LD) and store (ST) requests received from the affiliated processor cores 200. To service a ST request received from one of L2 STQs 302a, 302b, controller 310 allocates an RC machine 312 in an idle (unbusy) state to the ST request. The allocated RC machine 312 may perform a directory write to update the relevant entry of one of L2 directories 306, if necessary. In addition, the RC machine 312 may perform a cache write to update the relevant cache line in one of L2 data arrays 304. When all operations for the given request have been completed, the RC machine 312 returns to an unbusy state.

Figure 4:
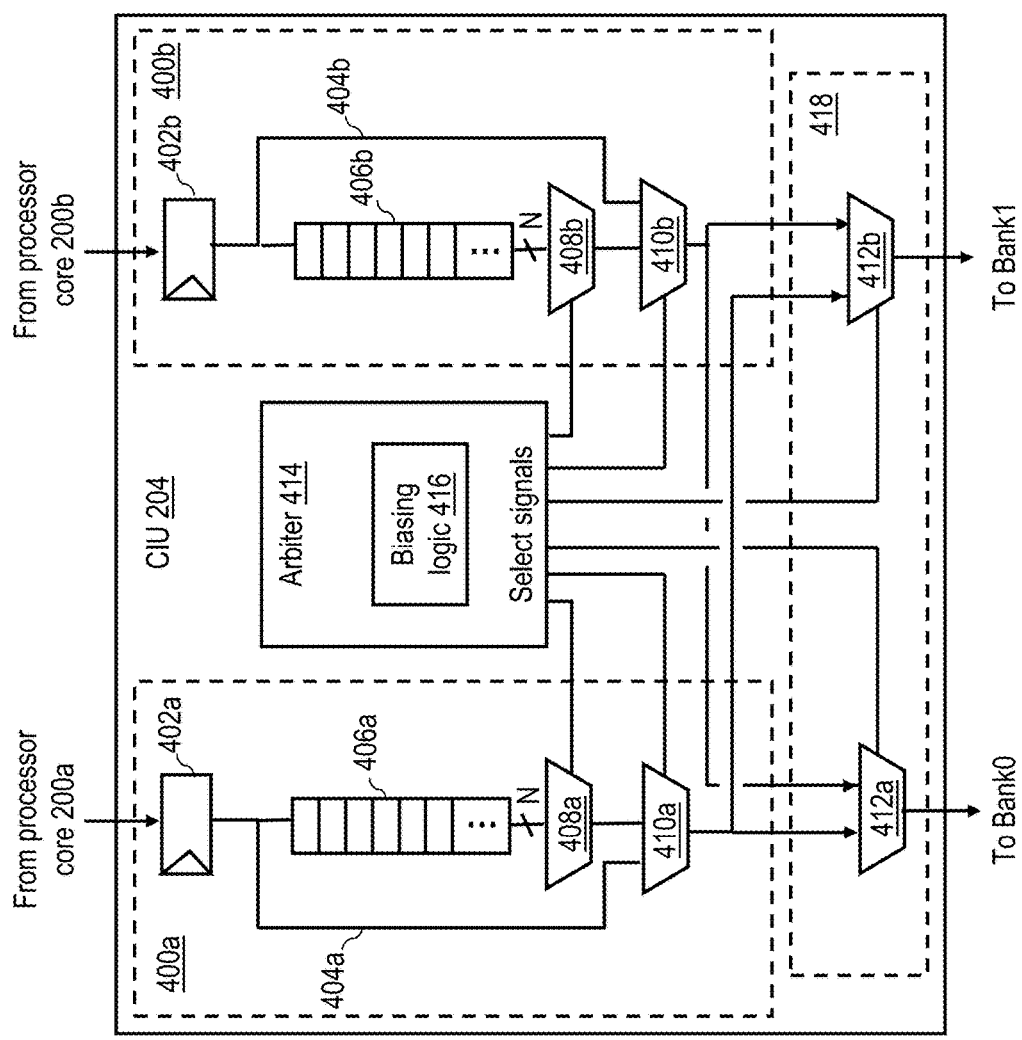
FIG. 4 is a block diagram of a core interface unit (CIU) in accordance with one embodiment.

Referring now to FIG. 4, there is depicted a more detailed block diagram of an exemplary embodiment of the core interface unit (CIU) 204 coupled between processor cores 200 and L2 cache 230 in accordance with one embodiment. In the illustrated embodiment, CIU 204 includes a respective instance of queuing and selection logic 400 for each processor core 200 coupled to CIU 204. Thus, in the illustrated embodiment in which CIU 204 is coupled to receive ST requests of two processor cores 200a, 200b, CIU 204 includes two identical instances of queuing and selection logic 400a and 400b (of which only queuing and selection logic 400a is described in detail below). CIU 204 additionally includes output logic 418 that outputs ST requests to the various banks implemented in L2 cache 230. In the depicted embodiment, output logic 418 includes a respective output multiplexer 412 for each L2 bank, namely, an output multiplexer 412a that transmits ST requests to bank0 300a and an output multiplexer 412b that transmits ST requests to bank1 300*b*. The operation of the queuing and selection logic 400*a*, 400*b* and output logic 418 is controlled by an arbiter 414 through the assertion/deassertion of various select signals, as described below. As described in greater detail below with reference to FIG. 6, arbiter 414 includes biasing logic 416 that selectively biases selection of ST requests by arbiter 414 to temporarily favor ST requests of one processor core 200 (and to disfavor ST requests of other processor cores(s) 200) in order to improve utilization of ST bandwidth in banked L2 cache 230.

Referring now to queuing and selection logic 400*a*, an input latch 402*a* is coupled to receive ST requests from the associated processor core 200*a* based on a timing established by an unillustrated clock signal. The ST request received in input latch 402*a* is presented to a first input of a multiplexer 410*a* via a bypass path 404*a*, as well as to a CIU STQ 406*a*. If not selected by multiplexer 410*a*, the ST request is buffered in CIU STQ 406*a*. In one preferred embodiment, CIU STQ 406*a* is implemented as an array containing, for example, 8 or 16 entries. The ST requests buffered in the entries of CIU STQ 406 are all presented to a multiplexer 408*a*, which selects one of the ST requests in response to assertion of a select signal by arbiter 414. Thus, ST requests can be selected from CIU STQ 406 for processing in any order. The ST request selected from among those buffered in CIU STQ 406 is presented for selection by arbiter 414 at a second input of multiplexer 410*a*. One of the ST requests presented at the first and second inputs of multiplexer 410*a* is then selected in response to assertion of a select signal by arbiter 414 and forwarded to an input of each of the output multiplexers 412*a*, 412*b* within output logic 418.

In response to select signals generated by arbiter 414, output multiplexers 418 select ST requests to forward to the various banks of L2 cache memory 230 (e.g., bank0 300*a* or bank1 300*b*). Thus, with the exemplary configuration illustrated in FIG. 4, arbiter 414 can select to send to either L2 store queue 302*a* or 302*b* 1) any of the ST requests of processor core 200*a* buffered in CIU STQ 406*a*, 2) any of the ST requests of processor core 200*b* buffered in CIU STQ 406*b*, 3) the newest, incoming ST request from processor core 200*a* (transmitted via bypass path 404*a*), or 4) the newest, incoming store data from processor core 200*b* (transmitted via bypass path 404*b*). This arrangement is particularly useful for permitting ST requests to bypass CIU STQs 406*a*, 406*b* when these arrays are empty.

Figure 5:
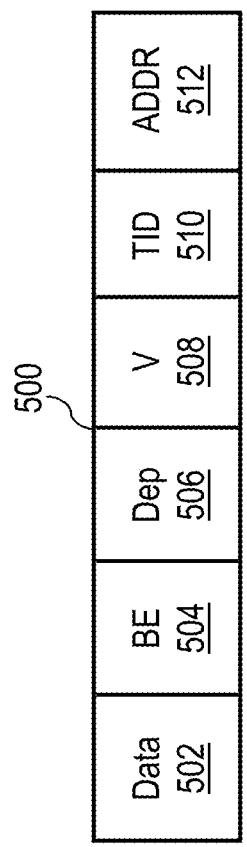
FIG. 5 is a block diagram of an entry in a CIU store queue (STQ) in accordance with one embodiment.

With reference now to FIG. 5, there is a block diagram of an exemplary entry 500 in a CIU STQ 406*a*, 406*b* in accordance with one embodiment. As shown, entry 500 includes a data field 502, which may buffer up to 16 bytes of data to be stored in L2 cache 230 and/or a system memory 108. The particular bytes of data present in data field 502 are indicated utilizing 1-hot encoding in byte enable (BE) field 504. Entry 500 additionally includes a dependency field 506 indicating the other entry or entries 500, if any, on which this entry 500 depends. For example, in one embodiment, dependency field 506 may be implemented as a bit vector having a plurality of bits each corresponding to another entry in the same CIU STQ 406. In this embodiment, if the ST request in entry 500 is to be ordered after the ST request in another entry, the dependency bit associated with that other entry is set to "1"; otherwise, if the ST request in entry 500 is not to be ordered with respect to the ST request in another entry, the dependency bit associated with that other entry is set to "0". In general, a ST request is ordered after any prior (i.e., older) ST request generated by the same thread. It should be appreciated that the ordering of store requests may alternatively be implemented utilizing another type of data structure, such as a linked list.

As further shown in FIG. 5, entry 500 further includes a valid bit 508 indicating whether or not the contents of entry 500 are valid, a thread ID (TID) field 510 that identifies the thread that issued the ST request. Finally, entry 500 includes an address (ADDR) field 512 that stores the target real address of the ST request.

Figure 6:
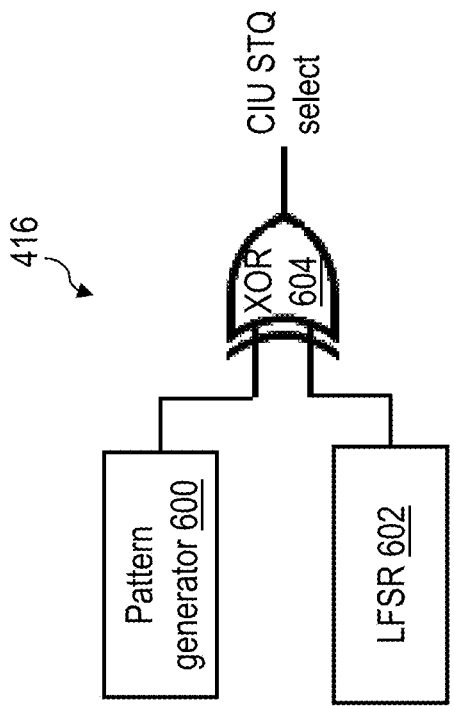
FIG. 6 is a block diagram of biasing logic in a CIU in accordance with one embodiment.

Referring now to FIG. 6, there is depicted a block diagram of biasing logic 416 of FIG. 4 in accordance with one embodiment. As noted above, biasing logic 416 can be utilized to apply a bias to the selection of ST requests by arbiter 414 such that arbiter 414 selectively and temporarily gives precedence to ST requests of one processor core 200 over those of the other processor core 200 in order to improve utilization of the store bandwidth of banked L2 cache 230.

In the illustrated embodiment, biasing logic 416 includes a pattern generator 600 that alternates between outputting a "1" and outputting a "0" on a long time scale relative to the clock frequency of CIU 204, for example, every 1000 or 2000 cycles. Biasing logic 416 additionally includes a linear-feedback shift register (LFSR) 602 that is configured to output a "0" for a large fraction of the clock cycles (e.g., 7 out of 8) and to output a "1" for the remaining fraction of clock cycles (e.g., 1 out of 8). The binary outputs of pattern generator 600 and LFSR 602 are received as inputs of an exclusive OR (XOR) gate 604, which generates an output signal indicating which of CIU STQ 406*a* and 406*b* to select if arbiter 414 detects that the store bandwidth of banked L2 cache 230 is not being adequately utilized, as described below with reference to blocks 806, 822 and 824 of FIG. 8. In this example, an output value of "0" may indicate that CIU STQ 406*a* is to be selected, while an output value of "1" may indicate that CIU STQ 406*b* is to be selected. It should be appreciated that given the pattern output by LFSR 602, even while ST requests in a favored CIU STQ 406 are preferentially selected for issuance to L2 cache 230, the ST requests buffered in the non-favored CIU STQ 406 will still be selected for issuance at a ratio determined by LFSR 602.

Figures 7, 9:
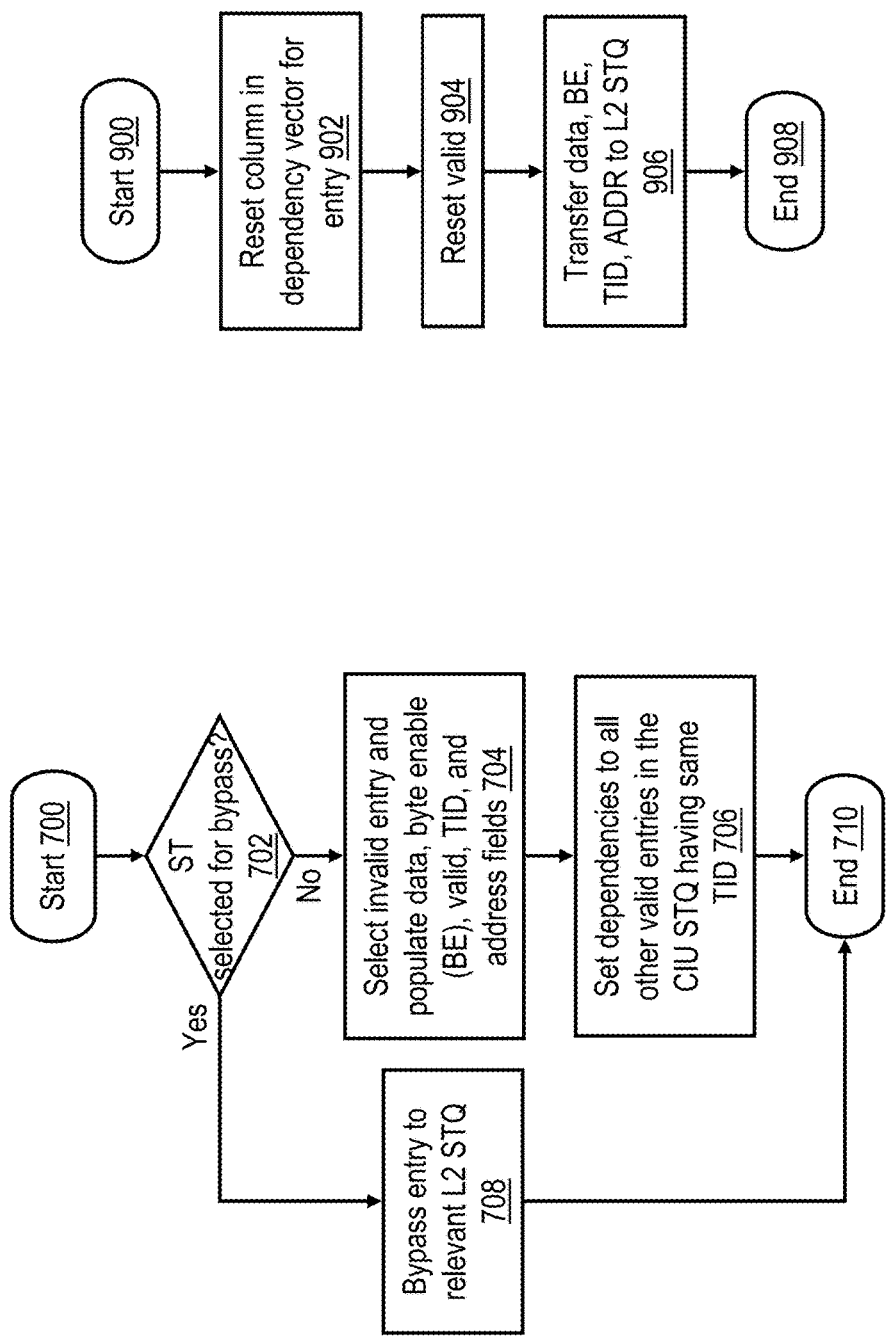
FIG. 7 is a high level logical flowchart of an exemplary method of installing a store (ST) request in a CIU STQ or bypassing the CIU STQ in accordance with one embodiment.
FIG. 9 is a high level logical flowchart of an exemplary method of removing a ST request from an entry in a CIU STQ in accordance with one embodiment.

With reference now to FIG. 7, there is illustrated a high level logical flowchart of an exemplary method of installing a store (ST) request in a CIU STQ 406 or bypassing the CIU STQ 406 in accordance with one embodiment. The illustrated method may be performed by arbiter 414 of CIU 204.

The process of FIG. 7 begins at block 700 in response to receipt by CIU 204 of a new, incoming ST request from one of processor cores 200*a*, 200*b*. The process then proceeds to block 702, which illustrates arbiter 414 determining whether or not the new, incoming ST request is selected to bypass the relevant one of CIU STQs 406*a*, 406*b*. For example, in one embodiment, arbiter 414 may select a ST request for bypass if the relevant CIU STQ 406 is empty or contains no other ST requests of the same thread. In response to determining at block 702 that the ST request is to be bypassed, arbiter 414 causes the ST request to be passed to relevant bank of L2 cache 230 via bypass path 404*a* or 404*b*, multiplexer 410*a* or 410*b* and the relevant one of output multiplexers 412*a*, 412*b* (block 708). Thereafter, the process of FIG. 7 ends at block 710.

Returning to block 702, in response to determining that the ST request is not selected for bypass, the process proceeds from block 702 to block 704, which depicts arbiter 414 selecting an entry 500 in the relevant CIU STQ 406 that is currently invalid and then populating the data field 502, BE field 504, valid field 508, TID field 510 and address field 512 of the selected entry 500. At block 706, arbiter 414 additionally sets dependency field 506 to indicate that the entry 500 is dependent on all other valid entries in the same CIU STQ 406 having the same TID. In this manner, the ST request can buffered in CIU STQ 406 until selected by arbiter 414 for issuance to L2 cache 230. Following block 706, the process of FIG. 7 ends at block 710.

Figure 8:
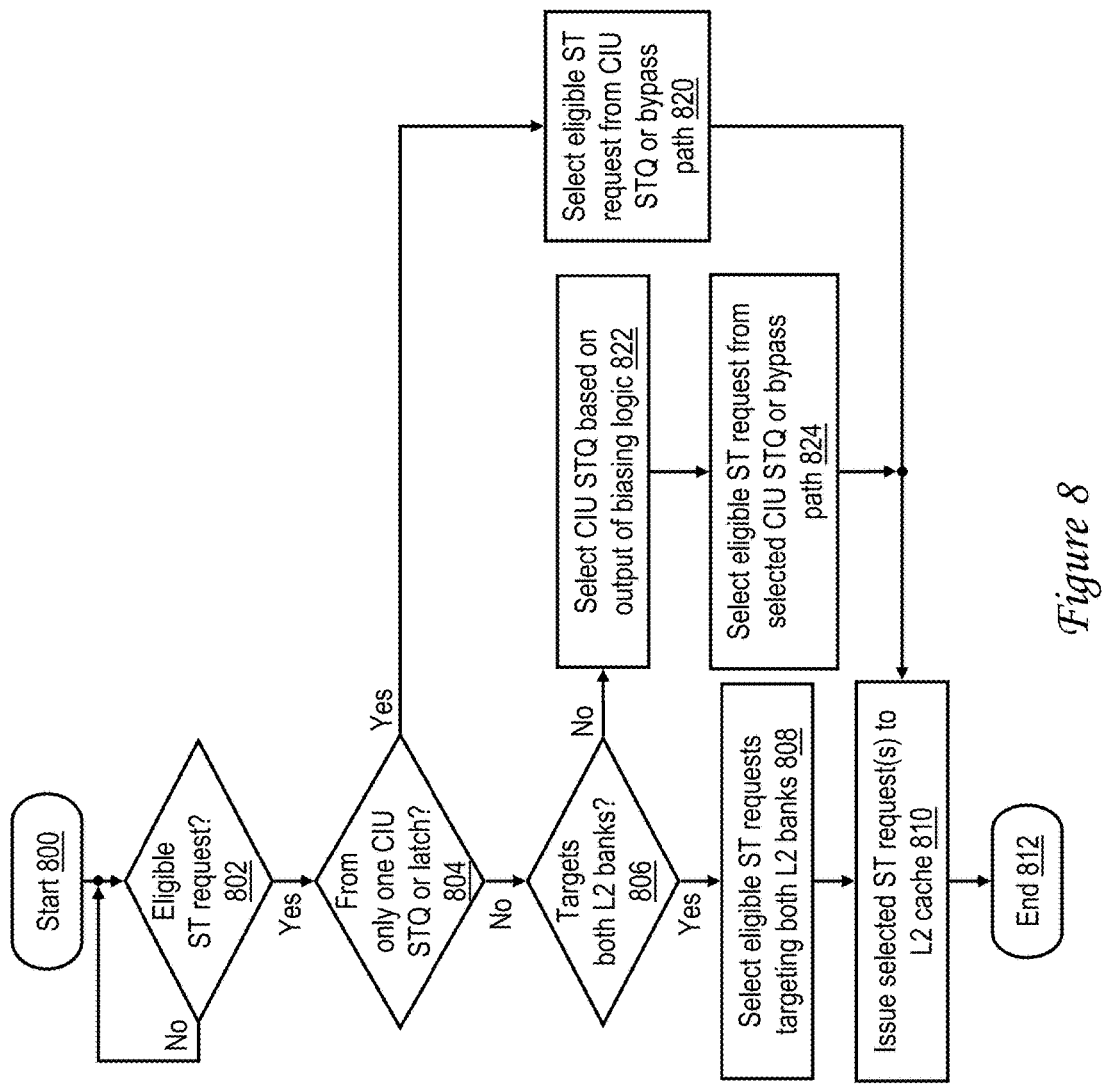
FIG. 8 is a high level logical flowchart of an exemplary method of selecting a ST request to issue from the CIU to a banked cache.

Referring now to FIG. 8, there is depicted a high level logical flowchart of an exemplary method of selecting a ST request to issue from CIU 204 to a banked lower level cache in accordance with one embodiment. The process of FIG. 8 begins at block 800 and then proceeds to block 802, which illustrates arbiter 414 determining whether either of CIU STQs 406a, 406b or input latches 402a, 402b buffers a ST request eligible for issue to banked L2 cache 230. If not, the process iterates at block 802. In response to a determination that CIU STQs 406 and input latches 402 contain at least one ST request eligible for issue to L2 cache 230, the process proceeds to block 804.

Block 804 depicts arbiter 414 additionally determining whether or not the eligible ST request(s) are from one or both processor cores 200 (i.e., from both CIU STQ and latch pairs 402a-402b and 406a-406b). In response to a determination at block 804 that all eligible ST request reside in only one CIU STQ and latch pair, arbiter 414 selects (e.g., randomly) an eligible ST request from the CIU STQ 406 or the associated bypass path 404 through the assertion/deassertion of select signals controlling multiplexers 408 and 410 (block 820). Thereafter, the process passes to block 810, which is described below.

Returning to block 804, in response to a determination at block 804 that ST requests of both processor cores 200a, 200b are eligible for issue, arbiter 414 additionally determines at block 806 whether or not there is at least a threshold distribution of the target addresses of the eligible ST requests among the banks 300 of L2 cache 230. In one preferred embodiment, arbiter 414 determines at block 806 whether the eligible ST requests target both banks of L2 cache 230 or only a single bank of L2 cache 230. In response to a determination at block 806 that the eligible ST requests target both banks of L2 cache 230, arbiter 414 selects (e.g., randomly) from among the eligible ST requests two ST requests targeting both banks of L2 cache 230 through the assertion/deassertion of select signals controlling multiplexers 408 and 410. Thereafter, the process passes to block 810, which is described below.

Referring again to block 806, in response to a determination that all eligible ST request target only one bank of L2 cache 230, arbiter 414 selects one of CIU STQs 406 based on the indication output by biasing logic 416 (block 822). In addition, arbiter 414 selects (e.g., randomly) an eligible ST request from the selected CIU STQ 406 or the associated bypass path 404 through the assertion/deassertion of select signals controlling multiplexers 408 and 410 (block 824). The process then proceeds to block 810, which illustrates arbiter 414 issuing the ST request(s) selected at block 808, 820 or 824 to the relevant bank(s) 300 of L2 cache 230. Thereafter, the process of FIG. 8 ends at block 812.

Given that CIU STQs 406 may each have multiple (e.g., 8 or 16) entries 500, it might seem reasonable to expect that there would always be eligible ST requests targeting different banks of L2 cache 230 present within CIU STQs 406 or their associated latches 402. However, the present disclosure recognizes that such is not the case. In fact, it can often be the case that CIU STQs 406 and latches 402 contain only ST requests targeting only one bank of L2 cache 230, resulting in a failure to fully utilize the store bandwidth of L2 cache 230. This situation may arise, for example, due to a size mismatch between the entries in CIU STQ 406 and L2 STQ entries 302. For example, in one embodiment, CIU STQs 406 may include 8 entries each capable of storing 16 bytes of store data in their data fields 502, while entries in L2 STQs 302 may be capable of holding 128 bytes of store data forming a full cache line. With this arrangement, if a processor core 200 stores a full cache line of data to L2 cache 230, the corresponding ST request for this one cache line will completely fill the 8 entries 500 of one of the CIU STQ arrays 406. Further, due to successive store accesses having a common stride that maps to same bank, a processor core 200 may store a succession of cache lines that are all destined for one or the other of banks 300a, 300b of L2 cache 230. Consequently, the store data for such a succession of cache lines will fill the entries 500 of a CIU STQ 406 for many consecutive store cycles. Still further, in some cases, another processor core 200 may also concurrently write a succession of cache lines that are all destined for the same bank 300 of L2 cache 230, so that both CIU STQs 406 are filled for many cycles with ST requests targeting the same bank 300. As a result, the store bandwidth of L2 cache 230 will be no more than 50% utilized.

It will be appreciated that the imbalance between the workloads directed to the various banks of the L2 cache 230 cannot be corrected by application of a conventional round robin arbitration policy. Consequently, as described above, in at least one embodiment, arbiter 414 preferentially selects ST requests from one of CIU STQ 406 in an attempt to accelerate the store workload of the associated processor core 200 and to (hopefully) find subsequent ST requests targeting a different bank 300 of L2 cache 230. In a preferred embodiment, even while giving preference to ST requests of one processor core 200 over the other(s), arbiter 414 allows some small fraction of ST requests of the non-favored processor core(s) 200 to be issued to L2 cache 230 so that the storage workload of the non-favored processor core(s) 200 makes at least some forward progress while the bank imbalance is being resolved.

With reference now to FIG. 9, there is illustrated a high level logical flowchart of an exemplary method of removing a ST request from an entry 500 in a CIU STQ 406 in accordance with one embodiment. The process of FIG. 9 can be performed, for example, at block 810 of FIG. 8.

The process of FIG. 9 begins at block 900 and then proceeds to block 902, which illustrates arbiter 414 resetting the column corresponding to the subject entry 500 in the dependency fields 506 of all other entries 500 of the relevant CIU STQ 406. Resetting the column of bits spanning the dependency fields 506 removes any dependency of other ST requests to the ST request to be issued. Arbiter 414 additionally resets the valid field 508 of the entry 500 to indicate that it can be overwritten by a subsequently received ST request (block 904). Arbiter 414 also asserts the appropriate signal signals to transfer the contents of data field 502, BE field 504, TID field 510 and address field 512 to the L2 STQ 302 of the appropriate one of bank0 300a and bank1 300b of L2 cache 230. Thereafter, the process of FIG. 9 ends at block 908.

Figure 10:
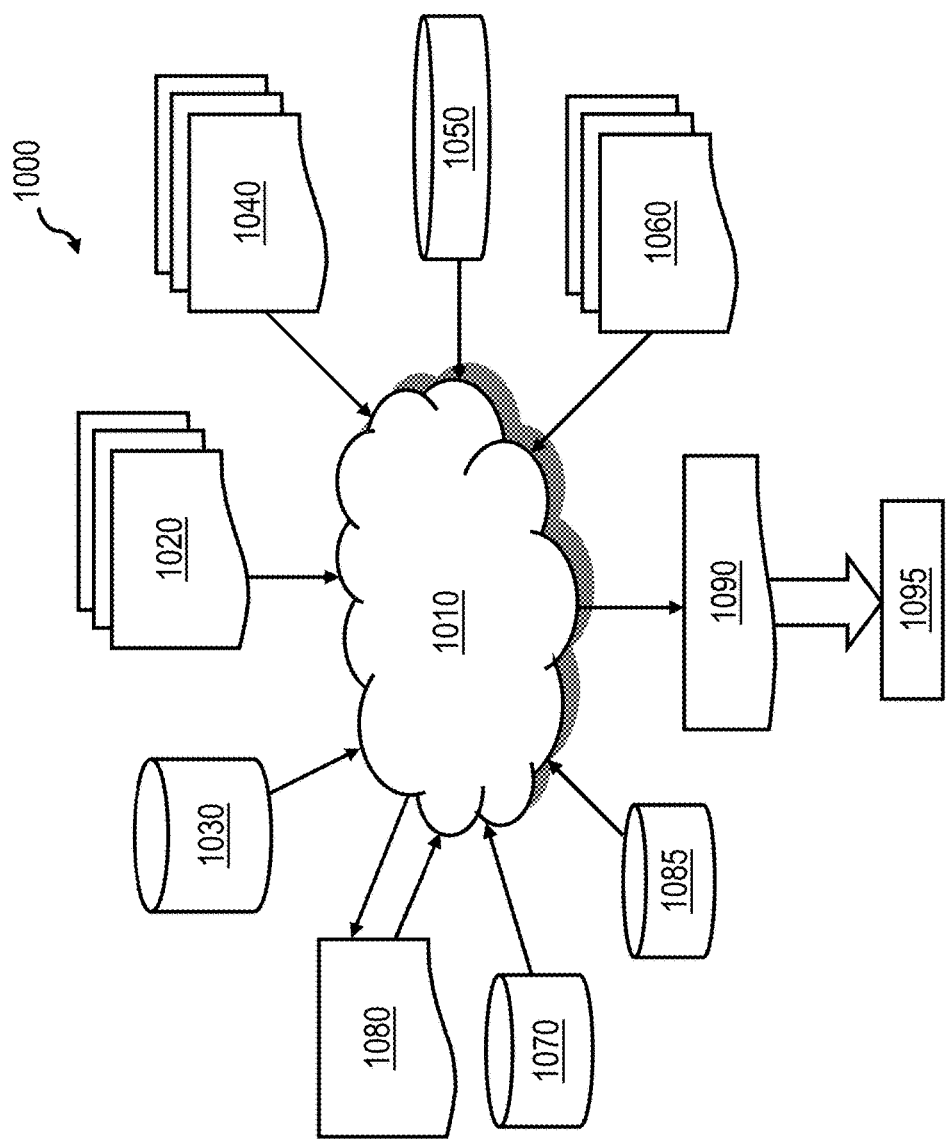
FIG. 10 is a data flow diagram illustrating a design process.

Referring now to FIG. 10, there is depicted a block diagram of an exemplary design flow 1000 used for example, in semiconductor IC logic design, simulation, test, layout, and manufacture. Design flow 1000 includes processes, machines and/or mechanisms for processing design structures or devices to generate logically or otherwise functionally equivalent representations of the design structures and/or devices described above and shown in FIGS.

1-6. The design structures processed and/or generated by design flow 1000 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1000 may vary depending on the type of representation being designed. For example, a design flow 1000 for building an application specific IC (ASIC) may differ from a design flow 1000 for designing a standard component or from a design flow 1000 for instantiating the design into a programmable array, for example a programmable gate array (PGA) or a field programmable gate array (FPGA) offered by Altera® Inc. or Xilinx® Inc.

FIG. 10 illustrates multiple such design structures including an input design structure 1020 that is preferably processed by a design process 1010. Design structure 1020 may be a logical simulation design structure generated and processed by design process 1010 to produce a logically equivalent functional representation of a hardware device. Design structure 1020 may also or alternatively comprise data and/or program instructions that when processed by design process 1010, generate a functional representation of the physical structure of a hardware device. Whether representing functional and/or structural design features, design structure 1020 may be generated using electronic computer-aided design (ECAD) such as implemented by a core developer/designer. When encoded on a machine-readable data transmission, gate array, or storage medium, design structure 1020 may be accessed and processed by one or more hardware and/or software modules within design process 1010 to simulate or otherwise functionally represent an electronic component, circuit, electronic or logic module, apparatus, device, or system such as those shown in FIGS. 1-6. As such, design structure 1020 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1010 preferably employs and incorporates hardware and/or software modules for synthesizing, translating, or otherwise processing a design/simulation functional equivalent of the components, circuits, devices, or logic structures shown in FIGS. 1-6 to generate a netlist 1080 which may contain design structures such as design structure 1020. Netlist 1080 may comprise, for example, compiled or otherwise processed data structures representing a list of wires, discrete components, logic gates, control circuits, I/O devices, models, etc. that describes the connections to other elements and circuits in an integrated circuit design. Netlist 1080 may be synthesized using an iterative process in which netlist 1080 is resynthesized one or more times depending on design specifications and parameters for the device. As with other design structure types described herein, netlist 1080 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1010 may include hardware and software modules for processing a variety of input data structure types including netlist 1080. Such data structure types may reside, for example, within library elements 1030 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1040, characterization data 1050, verification data 1060, design rules 1070, and test data files 1085 which may include input test patterns, output test results, and other testing information. Design process 1010 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1010 without deviating from the scope and spirit of the invention. Design process 1010 may also include modules for performing standard circuit design processes such as timing analysis, verification, design rule checking, place and route operations, etc.

Design process 1010 employs and incorporates logic and physical design tools such as HDL compilers and simulation model build tools to process design structure 1020 together with some or all of the depicted supporting data structures along with any additional mechanical design or data (if applicable), to generate a second design structure 1090. Design structure 1090 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1020, design structure 1090 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-6. In one embodiment, design structure 1090 may comprise a compiled, executable HDL simulation model that functionally simulates the devices shown in FIGS. 1-6.

Design structure 1090 may also employ a data format used for the exchange of layout data of integrated circuits and/or symbolic data format (e.g., information stored in a GDSII (GDS2), GL1, OASIS, map files, or any other suitable format for storing such design data structures). Design structure 1090 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-6. Design structure 1090 may then proceed to a stage 1095 where, for example, design structure 1090: proceeds to tape-out, is released to manufacturing, is released to a mask house, is sent to another design house, is sent back to the customer, etc.

As has been described, in at least one embodiment, a data processing system includes a plurality of processor cores each having a respective store-through upper level cache and a store-in banked lower level cache. Store requests of the plurality of processor cores destined for the banked lower level cache are buffered in multiple store queues including a first store queue and a second store queue. In response to determining that the multiple store queues contain store requests targeting a common bank of the banked lower level cache, store requests from the first store queue are temporarily favored for selection for issuance to the banked lower level cache over those in the second store queue.

While various embodiments have been particularly shown and described, it will be understood by those skilled in the art that various changes in form and detail may be made therein without departing from the spirit and scope of the appended claims and these alternate implementations all fall within the scope of the appended claims. For example, although embodiments have been described in which the number of processor cores is equal to the number of banks in the banked lower level cache, it should be appreciated that in other embodiments the number of processor cores (and CIU STQs) need not be equal to the number of banks in the banked lower level cache. As another example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like and is specifically restricted to only statutory subject matter, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a plurality of processor cores each having a respective store-through upper level cache and a store-in banked lower level cache, the method comprising:
    buffering store requests of the plurality of processor cores destined for the banked lower level cache in multiple store queues including a first store queue and a second store queue;
    determining whether all store requests in the multiple store queues target only the common bank of the banked lower level cache;
    based on determining that all store requests in the multiple store queues contain store requests targeting only a common bank of the banked lower level cache, temporarily favoring selection, for issuance to the banked lower level cache, of store requests from the first store queue over those in the second store queue, wherein temporarily favoring selection includes temporarily biasing arbitration logic to select store requests from the first store queue over those of the second store queue in multiple consecutive selections; and
    while temporarily favoring selection of store requests from the first store queue, selecting and issuing store requests to the common bank for processing from both the first store queue and the second store queue.

2. The method of claim 1, wherein the buffering includes buffering, in each of the multiple store queues, store requests of multiple threads of a respective one of the plurality of processor cores.

3. The method of claim 1, and further comprising:
    after the multiple consecutive selections, temporarily favoring selection, for issuance to the banked lower level cache, of store requests from the second store queue over those in the first store queue, wherein temporarily favoring selection includes temporarily favoring selection of the store requests from the second store queue over those of the first store queue in multiple additional consecutive selections.

4. A method of data processing in a data processing system including a plurality of processor cores each having a respective store-through upper level cache and a store-in banked lower level cache, the method comprising:
    buffering store requests of the plurality of processor cores destined for the banked lower level cache in multiple store queues including a first store queue and a second store queue;
    based on determining that the multiple store queues contain store requests targeting a common bank of the banked lower level cache, temporarily favoring selection, for issuance to the banked lower level cache, of store requests from the first store queue over those in the second store queue, wherein temporarily favoring selection includes temporarily biasing arbitration logic to select store requests from the first store queue over those of the second store queue in multiple consecutive selections; and
    while temporarily favoring selection of store requests from the first store queue, selecting and issuing store requests to the common bank for processing from both the first store queue and the second store queue, wherein the selecting includes randomly selecting a store request for issuance to the banked lower level cache from among a plurality of eligible store requests buffered in the first store queue.

5. A method of data processing in a data processing system including a plurality of processor cores each having a respective store-through upper level cache and a store-in banked lower level cache, the method comprising:

buffering store requests of the plurality of processor cores destined for the banked lower level cache in multiple store queues including a first store queue and a second store queue;

based on determining that the multiple store queues contain store requests targeting a common bank of the banked lower level cache, temporarily favoring selection, for issuance to the banked lower level cache, of store requests from the first store queue over those in the second store queue, wherein temporarily favoring selection includes temporarily biasing arbitration logic to select store requests from the first store queue over those of the second store queue in multiple consecutive selections; and while temporarily favoring selection of store requests from the first store queue, selecting and issuing store requests to the common bank for processing from both the first store queue and the second store queue, wherein the issuing includes:

while temporarily favoring selection of store requests from the first store queue, issuing a first number of store requests targeting the common bank from the first store queue and issuing a second number of store requests targeting the common bank from the second store queue in accordance with a predetermined ratio between the first and second numbers, wherein the predetermined ratio is greater than 1.

6. A method of data processing in a data processing system including a plurality of processor cores each having a respective store-through upper level cache and a store-in banked lower level cache, the method comprising:

buffering store requests of the plurality of processor cores destined for the banked lower level cache in multiple store queues including a first store queue and a second store queue;

determining whether store requests in the multiple store queues target multiple banks of the banked lower level cache;

based on determining that the multiple store queues contain store requests targeting a common bank of the banked lower level cache, temporarily favoring selection, for issuance to the banked lower level cache, of store requests from the first store queue over those in the second store queue, wherein temporarily favoring selection includes temporarily biasing arbitration logic to select store requests from the first store queue over those of the second store queue in multiple consecutive selections;

while temporarily favoring selection of store requests from the first store queue, selecting and issuing store requests to the common bank for processing from both the first store queue and the second store queue; and based on determining that the multiple store queues contain store requests targeting multiple banks of the banked lower level cache, concurrently issuing requests from the multiple queues to the multiple banks of the banked lower level cache.

7. The method of claim 6, and further comprising:

based on determining that the multiple store queues contain store requests targeting multiple banks of the banked lower level cache, refraining from favoring selection of store requests from the first store queue over those in the second store queue.

* * * * *